S. JACHIMOWICZ.
TURRET LATHE.
APPLICATION FILED JUNE 25, 1918.
1,346,892.
Patented July 20, 1920.
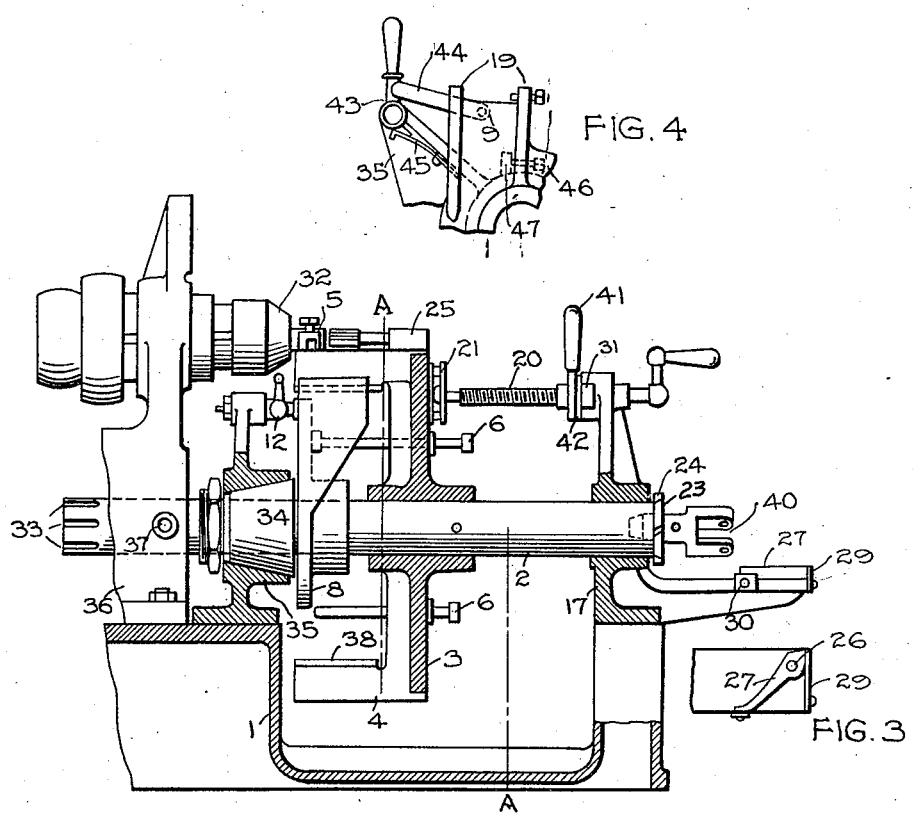
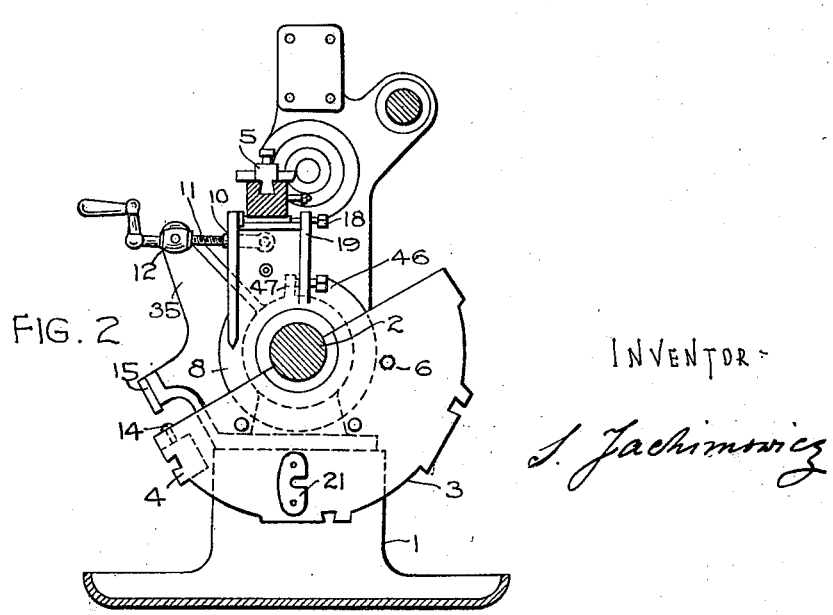
INVENTOR
S. Jachimowicz

UNITED STATES PATENT OFFICE.

SZYMON JACHIMOWICZ, OF GENEVA, SWITZERLAND.

TURRET-LATHE.

1,346,892.  Specification of Letters Patent.  Patented July 20, 1920.

Application filed June 25, 1918. Serial No. 241,866.

*To all whom it may concern:*

Be it known that I, SZYMON JACHIMOWICZ, engineer, a Polish citizen of Russia, residing at Rue de l'Arquebuse 27, Geneva, Switzerland, have invented new and useful Improvements in Turret-Lathes, of which the following is a specification.

This invention relates to a turret lathe mainly for working metal and employed for performing a series of operations upon a work piece held in the chuck of a live spindle of a lathe.

The main object of the invention is the provision of a disk or table of peculiar construction for the reception of various tools for operating upon the work. According to the invention the axis of rotation of said disk is parallel to the axis of the live spindle and the disk together with the tools may be fed by suitable means in the direction of the axis of the live spindle as well as across the same.

A further object of the invention is the provision of improved means for intermittently rotating the disk and for guiding the same during the working stroke.

Other objects of the invention will be hereinafter mentioned.

In the accompanying drawings:

Figure 1 shows the upper part of a turret lathe in sectional elevation;

Fig. 2 is a section on line A—A of Fig. 1;

Figs. 3 and 4 show details of construction.

Referring to the drawings, the numeral 1 denotes a bed of any suitable kind which may be mounted on legs or on a table. Upon this bed is a head-stock 36, in bearings of which is journaled a spindle driven by a belt upon a stepped pulley in the usual manner, said live-spindle carrying a chuck 32 in which the work to be operated upon may be secured.

In the bed 1, in supports 17 and 34 a horizontal spindle 2 is slidable in its axial direction and rotatably arranged. On the spindle 2 a disk 3 is keyed having on the periphery lugs 4 arranged in regular distances. The lugs 4 run parallel to the spindle 2, each is adapted to receive a toolpost 5 which may be adjusted and fixed thereon by any suitable means. Right opposite to the axis of rotation of chuck 32, upon the disk 8 a second tool holder 25 is provided and adapted to receive drills, reamers, etc. By that arrangement, two or more tools could be brought in action upon work simultaneously. The shaft 2 is journaled in a sleeve 34 which forms part of a guide plate 8. The plate 8 is rotatably journaled by the said sleeve 34 in a bracket 35 fixed to the bed of the machine. The plate 8 is provided with two ribs 19 serving as a guide for the lugs 4. To insure a perfect guidance of the lugs 4 between the ribs 19 with the smallest possible amount of back-lash adjusting screws 18 are arranged on the ribs 19 and plates 38 are adjustably arranged on the lugs 4 co-acting with the said screws 18. On the back of plate 8 there is a stud 9 on which a sleeve 10 is mounted by means of an eye. The sleeve 10 is provided with internal screw threads with which a screw-threaded portion of a spindle 11 engages. On each lug 4 an adjustable set screw 14 is provided which comes in contact with a guide piece 15 arranged on the bracket 35 when disk 3 is rotated thus limiting said rotation. The spindle 10 is journaled in a bearing 12 which is rotatably mounted by means of a trunnion in a bearing of the bracket 35. The spindle 11 is secured against axial displacement by means of set collars arranged on both sides of the bearing 12. By means of a handle the spindle 11 may be turned and the plate 8 rotated whereby the disk 3 is turned and the tool is moved in radial direction to the work piece. The shaft 2 may be moved in its axial direction by means of a lever (not shown in the drawings) which is pivoted on the bed of the machine and which is connected to the shaft 2 by means of a fork 40. The fork 40 is rotatably mounted on the shaft 2 but secured against axial displacement. The shaft 2 may be moved to and fro by means of the said hand lever. The inward movement of each tool is limited by a set screw 6 which strikes against a stop 7 on plate 8. By moving the shaft 2 (and therewith the disk 3 with the tools) away from the head stock it is automatically turned in such a manner that in place of the lug 4 receding from the ribs 19 the next one is placed in line with the ribs 19 so that by shifting the shaft 2 against the head stock a lug 4 is inserted between the ribs and a new tool brought to work. I attain the rotation of the shaft 2 by means of a toothed disk 23 fixed at the hind end of the shaft 2. The teeth 24 of this disk strike one after the other against a pawl 27 pivoted at 26 to the support 17. The pawl 27 is held in position by a flat spring 29 which presses the pawl 27 against a plate 30. The pawl 27 runs across the axis of the shaft 2 and is arranged in the path of the lowest tooth 24 of disk 23 in such a manner that the said tooth strikes against the pawl 27 as soon as the lug 4 has left the ribs 19 whereupon the tooth is forced sideward thus turning the shaft 2.

The disk 3 may be fed by means of a screw-threaded spindle 20 which is journaled in the support 17. On one end of spindle 20 there is a handle the other end of the spindle is provided with a head which projects behind a slotted plate 21 arranged on the disk 3. The screw threaded portion of spindle 20 passes through a nut 31 which consists of two parts slidably mounted in the support 17. The parts of the nut 31 may be brought in or out of engagement with the spindle 20 in the well known manner by means of a handle 41 and a cam disk 42. This arrangement allows a rapid return stroke of the tool as soon as the nut has been opened.

To insure a perfect guiding of the tool I provide a pin 37 in the support 36 which engages with groves 33 on the shaft 2. The grooves 33 are arranged at regular distances on the periphery of the shaft 3, the pin 37 guides the disk 3 during the return stroke.

Although in the drawing but one tool post is shown, it is obvious that on each of the lugs 4 one or many tools may be mounted, and made to work, one after the other, in the manner described.

The face of piece 15 may be curved, in which case the acting tool on the disk 3 could be forced to perform a corresponding curve, giving to the work a predetermined shape. In this case main lever and spindle 11 have to be brought in action simultaneously.

For the same purpose in place of the spindle 11 the arrangement shown on Fig. 4 could be used. It consists of the lever 43 pivoted in said bearing of the bracket 35 and connected by the link 44 to the stud 9 of the guide plate 8. A strong spring 45 fastened to the bracket 35 presses upon the lever 43 holding the guide plate 8 in a position being determined by the set screw 46 fastened upon plate 8 and stop 47 fastened on the bracket 35.

Having now particularly described my invention and in what manner the same is to be performed, what I claim is:

1. In a turret lathe, the combination of a live spindle with a chuck thereon, a turret spindle with a disk provided with means for holding tools fixed thereon, a rotatably mounted member for guiding axial motion of said disk, means for axial shifting of said disk and means for oscillating guiding member and therewith the disk.

2. In a turret lathe, the combination of a live spindle with a chuck thereon, a turret spindle parallel to the live spindle, with a turret disk provided with means for holding tools thereon, a guiding member upon said turret spindle rotatably mounted in the bed of the machine to guide motion of said turret disk, means to secure said guiding member, means to oscillate it and means to limit said oscillation.

3. In a turret lathe, the combination of a live spindle, a turret spindle parallel to a live spindle with a turret disk thereon, means for fastening tools upon periphery of said disk, a guiding member embracing turret spindle and rotatably mounted in the bed of the machine to guide motion of said turret disk, means for shifting turret disk, means for oscillating said guiding member and thereby the turret disk and means for turning said disk in a new working position on return stroke.

4. In a turret lathe, the combination of a live spindle with a chuck thereon, a turret spindle rotatably mounted and slidable in axial direction, with a turret disk thereon, lugs fixed on said disk adapted to hold tools, a guiding member rotatably mounted in the bed of the machine arranged to receive said lugs, a cross-feed device holding said guiding member in position, means for feeding the turret disk axially, means for feeding across to it and means for turning said disk into a new working position on the return stroke.

5. In a turret lathe the combination of a live spindle with a chuck thereon, a turret disk rotatably mounted and slidable in axial direction with a number of lugs thereon, means for fastening tools on said lugs, a guiding member for receiving guiding plates fastened on said lugs, said guiding member being held in position by a cross-feed device.

6. In a turret lathe the combination of a live spindle with a chuck thereon, a turret spindle rotatably mounted and slidable in axial direction, a turret disk fixed on said turret spindle and having a number of lugs thereon, said lugs being parallel to live spindle and adapted to hold toolbeams, guiding plates fastened to said turret disk, a guiding member rotatably mounted and adapted to receive said guiding plates, means for feeding said turrent disk axially, and means for oscillating said guiding member and thereby a turret disk crosswise.

7. In a turret lathe, the combination of a live sprindle with a chuck thereon, a turret spindle rotatably mounted and slidable in axial direction, parallel to said live spindle, a turret disk fixed upon said turret spindle and having a number of lugs thereon, said lugs being parallel to a spindle and adapted to receive tools, guiding plates fixed on said lugs, a guiding member adapted to receive said guiding plates, said guiding member being rotatably mounted in the bed of the machine, the cross-feed device engaging said guiding member, means to shift the turret disk axially, means to feed it across, means for limiting said cross-feed motion and means for bringing automatically turret disk in a new working position on the return stroke.

8. In a turret lathe, the combination of a live spindle with a chuck thereon, a turret spindle rotatably mounted and slidable in axial direction, parallel to said live spindle, a turret disk fixed upon said turret spindle and having a number of lugs thereon, said lugs being parallel to a spindle and adapted to receive tools, guiding plates fixed on said lugs, a guiding member adapted to receive said guiding plates, said guiding member being rotatably mounted in the bed of the machine, the cross-feed device to hold said guiding member in position, means to shift the turret disk axially, means to feed it across, means for limiting said cross-feed motion and means for bringing automatically turret disks in a new working position on the return stroke.

9. In a turret lathe, the combination of a live spindle, a guiding member rotatably mounted in the bed of the machine, the cross-feed device engaging said guiding member, a turret spindle journaled in said guiding member rotatably mounted and capable of axial displacement, a turret disk holding tools fixed on said turret spindle, a number of guiding plates fixed upon said turret disk, said guiding plates engaged by the guiding member on the working stroke.

10. In a turret lathe, the combination of a live spindle, a guiding member rotatably mounted in the bed of the machine, and held by cross-feed device, a turret spindle journaled in said guiding member rotatably mounted and capable of axial displacement, a turret disk fixed on said turret spindle, a number of guiding plates fixed upon said turret disk, said guiding plates engaged by the guiding member on the working stroke, the cross-feed device, means for axial shifting of turret disk, means for limiting said shifting, consisting of a stop upon the guiding member and adjustable screws upon the turret disk, means for oscillating guiding member and therewith a turret disk, said oscillation being limited by a stop-plate fixed on the bed of the machine and number of adjustable screws upon turret disk.

11. In a turret lathe, the combination of a live spindle, a guiding member rotatably mounted in the bed of the machine, a turret spindle journaled in said guiding member parallel to the live spindle, a turret disk fixed upon said turret spindle, a number of guiding plates fixed upon said turret disk and engaged during working stroke by said guiding member, the cross feed device, means for simultaneous feeding of said turret disk axially and crosswise and means for controlling said simultaneous feeding, consisting of profile plate fastened to the machine and set-screws fixed on the turret disk.

In testimony whereof I affix my signature in presence of two witnesses.

SZYMON JACHIMOWICZ

Witnesses:
   Louis H. Munier,
   J. Divorne.